United States Patent [19]
Lee et al.

(10) Patent No.: US 9,987,552 B2
(45) Date of Patent: Jun. 5, 2018

(54) METHOD AND SYSTEM FOR EXPRESSING EMOTION DURING GAME PLAY

(71) Applicant: SMILEGATE, INC., Gyeonggi-do (KR)

(72) Inventors: Jun Hee Lee, Seoul (KR); Hyuk Bin Kwon, Gyeonggi-do (KR)

(73) Assignee: SMILEGATE, INC., Seongnam-si, Gyeonggi-do (KR)

( * ) Notice: Subject to any disclaimer, the term of this patent is extended or adjusted under 35 U.S.C. 154(b) by 286 days.

(21) Appl. No.: 14/178,950

(22) Filed: Feb. 12, 2014

(65) Prior Publication Data
US 2015/0005064 A1    Jan. 1, 2015

(30) Foreign Application Priority Data

Jun. 26, 2013 (KR) .......................... 10-2013-0073910
Dec. 17, 2013 (KR) .......................... 10-2013-0156866

(51) Int. Cl.
*G06F 3/0484* (2013.01)
*A63F 13/00* (2014.01)
*A63F 13/87* (2014.01)

(52) U.S. Cl.
CPC .............. *A63F 13/00* (2013.01); *A63F 13/87* (2014.09); *G06F 3/0484* (2013.01)

(58) Field of Classification Search
CPC ........... A63F 13/00; G06F 3/14; G06F 3/0484
See application file for complete search history.

(56) References Cited

U.S. PATENT DOCUMENTS

| 6,064,383 | A  | * | 5/2000  | Skelly ..................... G06T 11/00 715/758 |
| 8,271,902 | B1 | * | 9/2012  | Mangini .......... H04M 1/72544 715/763 |
| 2003/0137515 | A1 | * | 7/2003 | Cederwall ............... G06T 13/40 345/473 |
| 2006/0025220 | A1 | * | 2/2006 | Macauley ............... A63F 13/12 463/42 |
| 2012/0294496 | A1 | * | 11/2012 | Nakamoto ......... G06K 9/00288 382/118 |
| 2013/0151257 | A1 | * | 6/2013 | MacMannis .......... G06F 3/0484 704/270 |
| 2013/0346914 | A1 | * | 12/2013 | Jeong .................... G06F 3/0485 715/784 |

FOREIGN PATENT DOCUMENTS

KR    10-0847119 B1    7/2008

* cited by examiner

*Primary Examiner* — James S McClellan
*Assistant Examiner* — Syvila Weatherford
(74) *Attorney, Agent, or Firm* — Rabin & Berdo, P.C.

(57) ABSTRACT

A method for expressing a user emotion during game play comprises displaying an emotion image received from an opponent terminal on a display of a terminal in which a game is played; displaying at least two emotion menus with respect to the displayed emotion image; making a first selection of an emotion type based on a user selection signal for any one of the displayed at least two emotion menus; making a second selection of an emotional scale based on a distance between a location on the display where the user selection signal is generated and the emotion image; changing the emotion image based on the first selected emotion type and the second selected emotional scale; and generating the changed emotion image into a response emotion image and transmitting the response emotion image to the opponent terminal.

1 Claim, 15 Drawing Sheets

METHOD AND SYSTEM FOR EXPRESSING EMOTION DURING GAME PLAY

CROSS-REFERENCE TO RELATED APPLICATIONS

This application claims priority under 35 U.S.C. § 119 to Korean Patent Application No. 10-2013-0073910, filed on Jun. 26, 2013, and Korean Patent Application No. 10-2013-0156866, filed on Dec. 17, 2013, in the Korean Intellectual Property Office, the disclosures of which are incorporated herein by reference in its entirety.

TECHNICAL FIELD

The present disclosure relates to a method and system for expressing a user emotion during game play, and more particularly, to a method and system for expressing a user emotion during game play in which emotion type selection is intuitively perceivable to a user and selection of an emotion and determination of an emotional scale is made concurrently by only one selection gesture, thereby enabling effective and quick emotion conveyance in a fast-paced game and providing a prompt response to an emotion expression of an opponent.

BACKGROUND

In support of the information and communication technologies, online or mobile games are gaining popularity. Generally, an online or mobile game may be classified into a single player game designed to be played by a single user and a multiplayer game designed to be played by at least two users at the same time.

In a case of a multiplayer game, because a plurality of users play the game in different places, the users cannot identify their faces one another, and as a result, there is a disadvantage that emotion exchange between the users is difficult.

Further, in a fast-paced game situation, there is a shortcoming that transmitting an emotion type and a level of emotion concurrently is difficult. For example, Korean Patent Application No. 2007-0123075 discloses a technology of connecting emotions mutually between characters in a role-playing game, but is incapable of transmitting an emotion type and a level of emotion of a game player using a single user gesture, and hence is unsuitable in a fast-paced game situation.

SUMMARY

The present disclosure provides a method for expressing an emotion during game play that may determine and transmit a user emotion effectively and make a prompt response to an emotion expression of an opponent in a fast-paced game situation, and a control apparatus therefor.

EFFECT

According to the present disclosure, opposing emotion menus are displayed symmetrically with respect to an image representing a user emotion. Subsequently, a user selects a particular menu among the plurality of emotion menus displayed symmetrically, and in this instance, an extent of image change representing an emotion type is determined based on a distance between a menu selection point and a center point of the image.

Accordingly, the present disclosure has an effect of enabling effective and quick emotion conveyance in a fast-paced game because emotion type selection is intuitively perceivable to the user and selection of an emotion and determination of an emotional scale is made concurrently by only one selection gesture.

Also, the present disclosure has an effect of enabling effective and quick emotion conveyance in a fast-paced game and of making a prompt response to an emotion expression of an opponent.

BRIEF DESCRIPTION OF THE DRAWINGS

FIGS. 2 through 7(b) are diagrams illustrating the method for expressing the emotion during game play according to the first embodiment of the present disclosure.

DETAILED DESCRIPTION OF EMBODIMENTS

Figure 1:
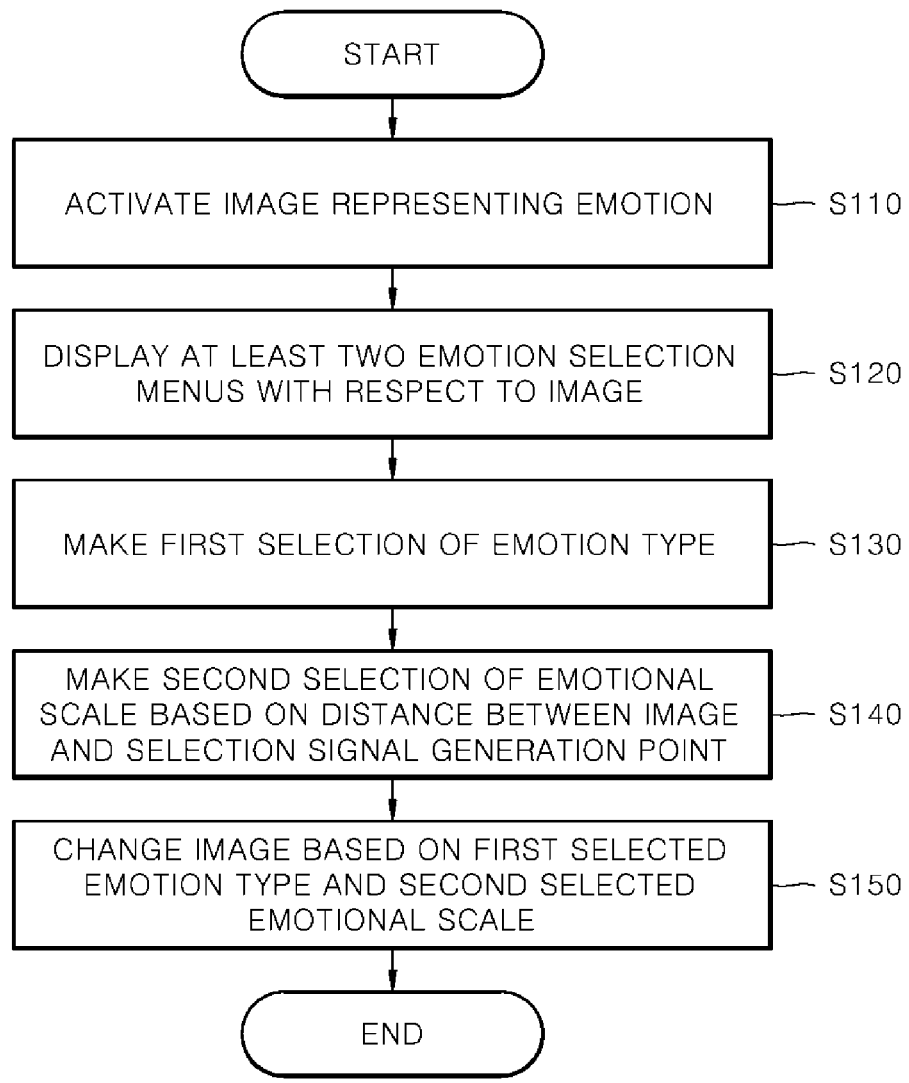
FIG. 1 is a flowchart illustrating a method for expressing a user emotion during game play according to a first embodiment of the present disclosure.

Hereinafter, a detailed description will be provided with reference to the accompanying drawings to allow a person having ordinary skill in the art pertaining to the present disclosure to easily practice the embodiments of the present disclosure. In the following description, the same names and the same reference numerals are provided to the same elements for the convenience of description.

The terms as used herein are selected from common words being currently used as widely as possible, but in a particular case, some of them may be selected arbitrarily by the Applicant, and in this case, their meanings are specifically explained in the corresponding description of the present disclosure. Accordingly, the present disclosure should be understood by the meanings of the words rather than the names of the words.

It will be further understood that the suffices for elements "module" and "unit" used hereinafter are only given in consideration of easiness of writing the specification and may be interchangeably used, and they do not have distinguishable meanings or roles from one another.

FIG. 1 is a flowchart illustrating a method for expressing a user emotion during game play according to a first embodiment of the present disclosure.

Referring to FIG. 1, an image representing a user emotion is activated on a display of a terminal in which a game is played (S110). In the specification, the game represents a game that may be played by a plurality of users using a computer, a mobile device, and the like.

In the present disclosure, the terminal includes a computer with a display, a mobile device (a mobile phone, a tablet computer, etc), and the like, and activation of the image represents enabling selection of an emotion type and an emotional scale with respect to the image in the terminal based on an electrical signal generated by a manipulation gesture of the user. Accordingly, as the image is activated, at least two emotion menus are displayed with respect to the activated image (S120).

In the first embodiment of the present disclosure, the at least two emotion menus have a shape of a bar or a pizza slice and are radially formed with respect to the image, and contrasting emotions (for example, 'anger-joy', 'excitement'-'boredom') are symmetrically organized. Thereby, the user may select the emotion type more intuitively.

After the emotion selection menu is displayed with respect to the image, a first selection of an emotion type is made based on a user selection signal for any one of the displayed at least two emotion menus (S130). For example, an electrical signal generated by a touch or mouse click signal may be the user selection signal, and in this instance, the user selection signal may be generated at one point of the emotion selection menu.

As described in the foregoing, the emotion type is selected by the first selection, and the present disclosure allows a second selection of an emotional scale based on a distance between the point (that is, a location on the display where the user selection signal is generated) of the emotion selection menu and the image (S140).

That is, the present disclosure is designed by the Inventor to change the emotional scale based on the distance between the image and the selection location (for example, a touch location in a case of a touchscreen, or a dragging end location). For example, when a great anger is intended to be displayed, a greatest anger may be selected by touching or performing a mouse click on a furthest point from the image among an anger menu.

Since the emotion type and the emotional scale to be transmitted are selected at once only by one selection, the method according to the present disclosure is particularly useful in a fast-paced game situation.

Subsequently, the image is changed based on the first selected emotion type and the second selected emotional scale (S150). In the first embodiment of the present disclosure, the image is changed such that a type of the image change is determined based on the emotion type and an extent of the image change is determined based on the emotional scale.

For example, when the emotion type is 'joy', the image (a character, a photo) changes to a smiley expression, and when a scale of joy is great, the image changes to a brighter smiley expression. In the present disclosure, the first selection and the second selection are concurrently made by one selection gesture of the user, and as a result, effective and quick emotion conveyance is achieved even in a fast-paced game situation.

Hereinafter, the method for expressing the emotion during game play according to the first embodiment of the present disclosure is described with reference to the drawings.

FIGS. 2 through 7 are diagrams illustrating the method for expressing the emotion during game play according to the first embodiment of the present disclosure.

Figure 2:
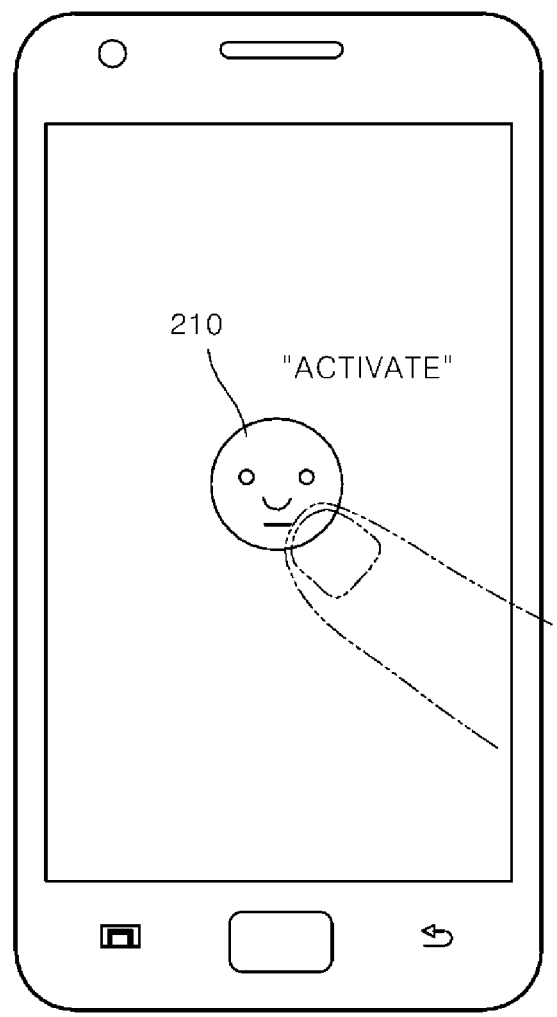

Referring to FIG. 2, an image 210 is activated on a display of a terminal in which a game is played. Here, "activated" represents that an emotion selection menu is displayed by a manipulation gesture (for example, a touch, a mouse click) of a user. For example, in the step of activating the image representing the user emotion, the image may be activated by the user moving the image to a center of the display by a touch or drag gesture for the image.

Figure 3:
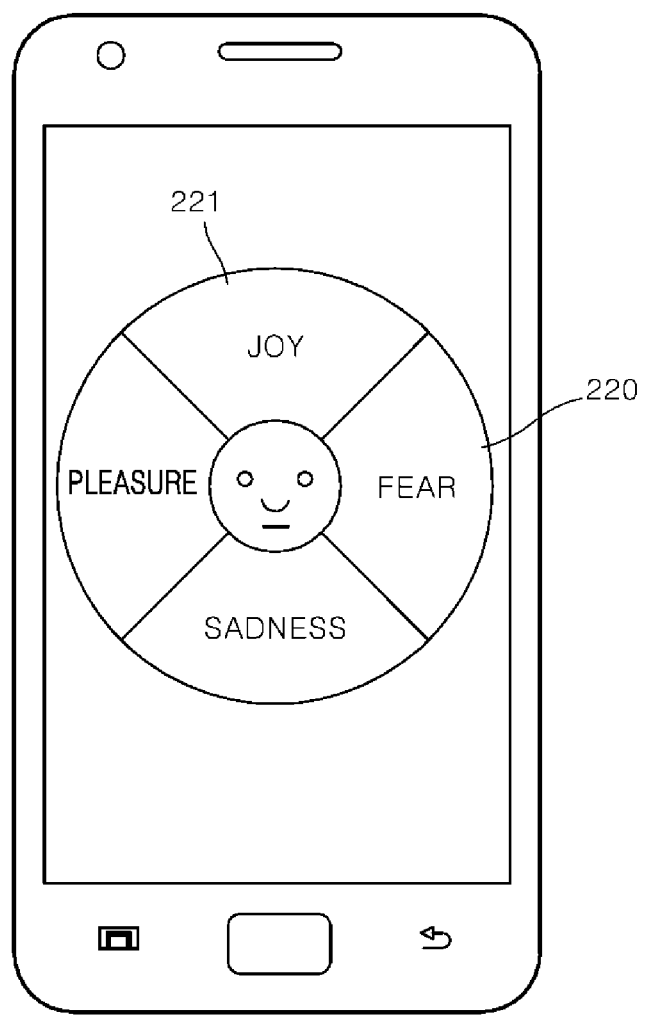

Referring to FIG. 3, as the image is activated, an emotion selection menu 220 is displayed radially with respect to the image in a shape of a pizza slice. Accordingly, the emotion selection menu is formed of a circular disc as a whole, and the respective emotion selection menus correspond to slices of the circular disc.

By a manipulation signal for selecting any one of the slices provided on the display, an emotion type corresponding to the slice selected is selected, and in the first embodiment of the present disclosure, opposing types of emotions are symmetrically organized. Dissimilarly, the emotion selection menu may be displayed in a shape of a bar, and this falls within the scope of the present disclosure as long as the emotion selection menu is displayed along the periphery of the image at least with respect to the image.

Figure 4:
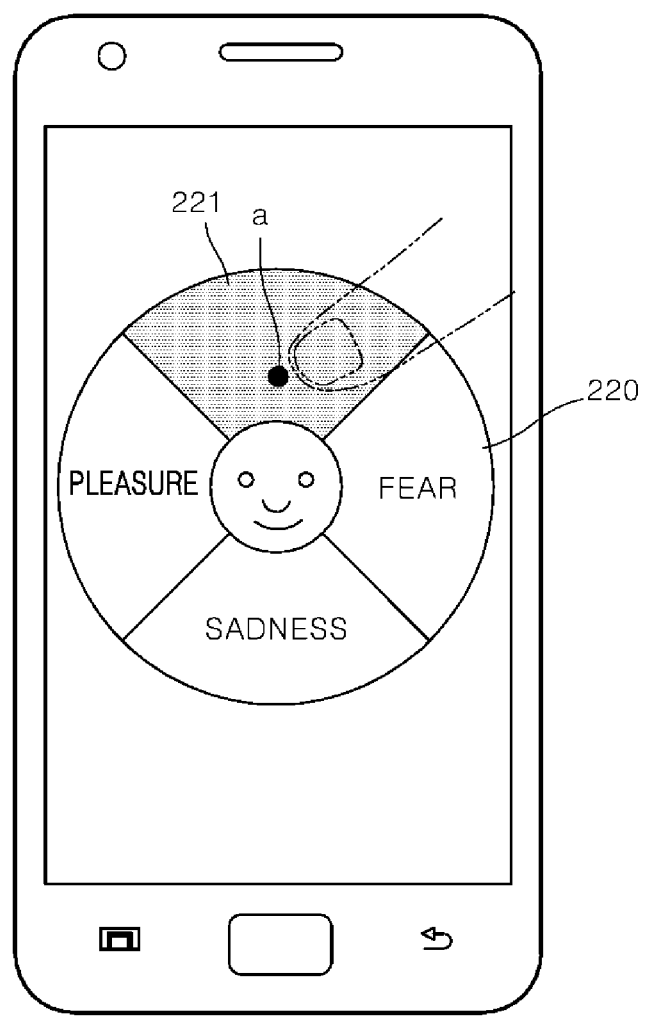

Referring to FIG. 4, when a menu 221 corresponding to 'joy' among the emotion selection menu 220 is selected by a touch or mouse click gesture, the image (character) at the center of the circular disc-shaped emotion selection menu 220 changes to a smiley expression.

Figure 5:
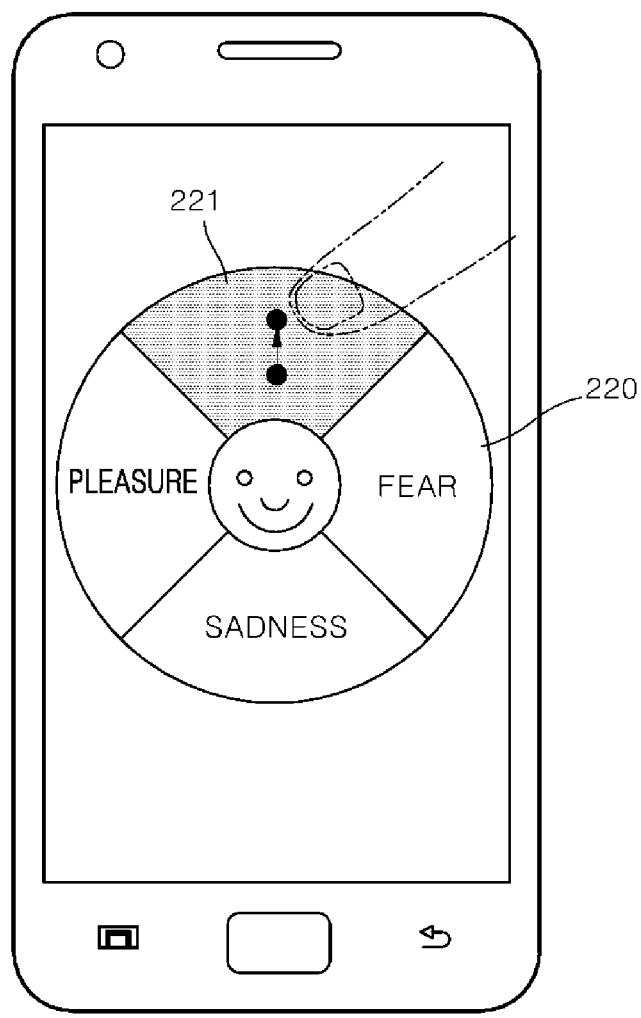

Referring to FIG. 5, an extent of change of the image varies based on a distance of a final selection point from the center image, and in FIG. 5, as the distance increases, the image changes to a smiley expression of a larger scale.

Figure 6:
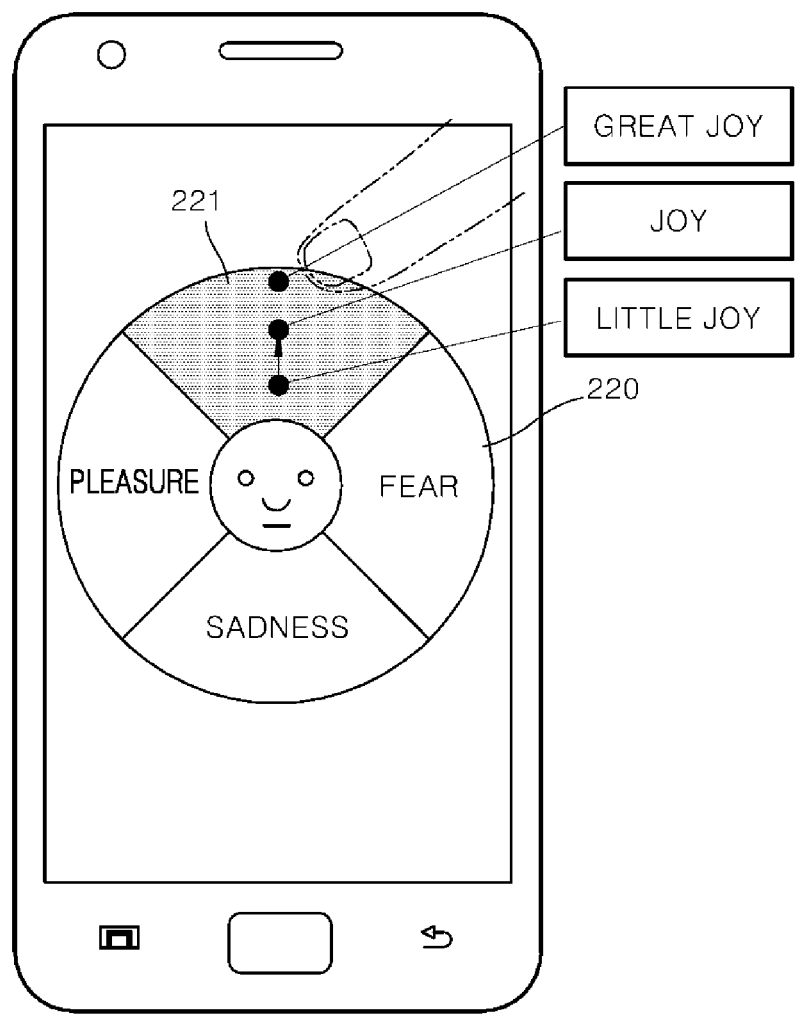
Figure 7:
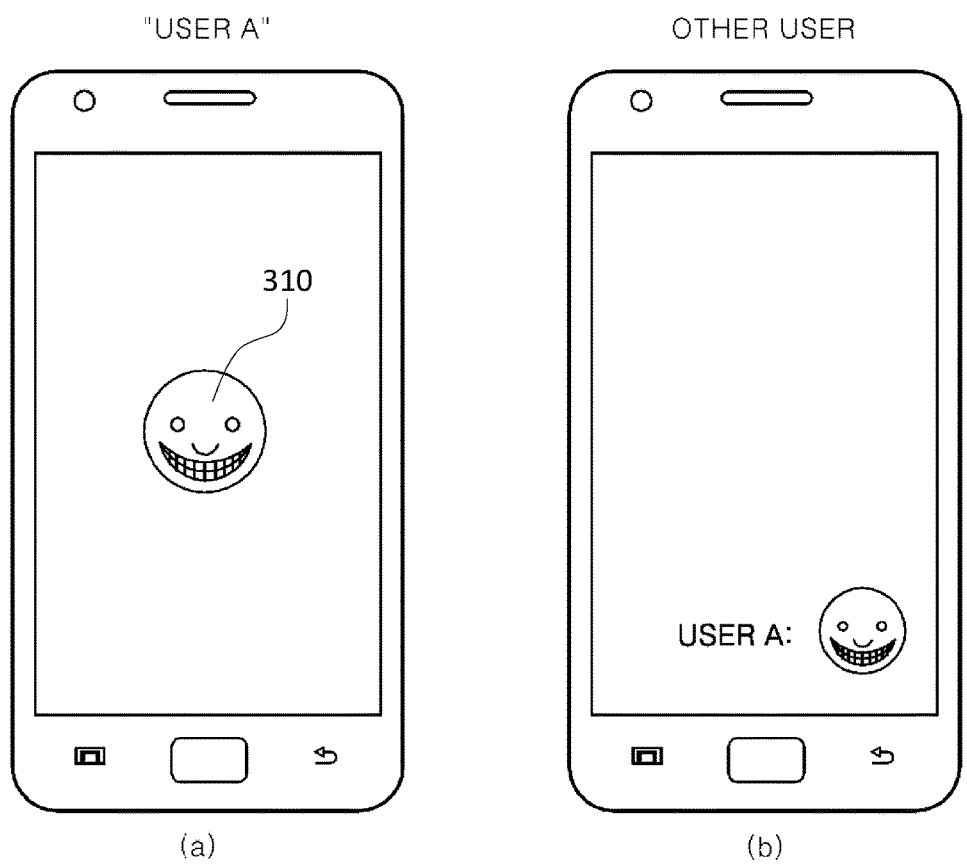

FIG. 6 illustrates an embodiment in which based on a distant point of the emotion selection menu, emotion information corresponding to the point is displayed. In this case, the user may effectively select desired emotion information by touching or clicking the corresponding point beforehand.

In FIG. 7(a) and (b), the image changed based on the selected type and scale is transmitted to a game terminal of other user with whom the user is playing the game via a server or the like. Thereby, the user may transmit desired emotion type and scale to other user quickly only by one selection gesture (a touch, a drag, a mouse click).

For example, if the changed image is not activated again, the image maintains the changed state and the user may transmit his/her emotion as an image by dragging the image and dropping it to a character of other user with whom the user is playing the game. Alternatively, the user may transmit the image through a chat window appearing during the game. That is, it falls within the scope of the present disclosure so long as at least the changed image is transmitted to the terminal of other user.

Figure 8:
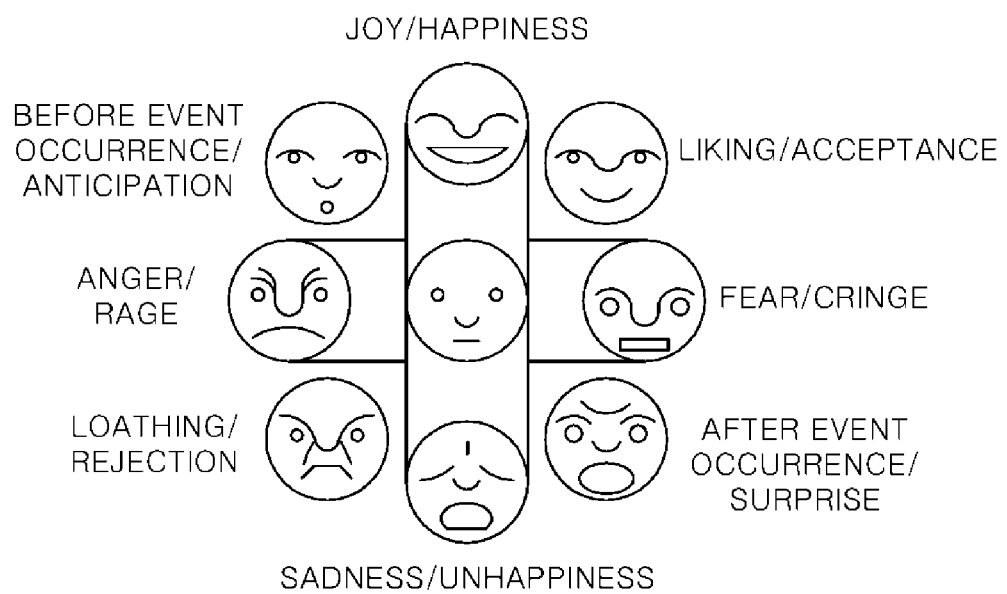
FIG. 8 is a diagram illustrating the emotion selection menu according to the first embodiment of the present disclosure.

FIG. 8 is a diagram illustrating the emotion selection menu according to the first embodiment of the present disclosure.

Referring to FIG. 8, an image changing based on an emotion selection menu type and an emotional scale selected based on a distance between a selection signal generation point (for example, a touch point, a point at which the touch is released after dragging) and a center point of the image are displayed at the center, and emotion selection menus are displayed radially with respect to the image.

Figure 9:
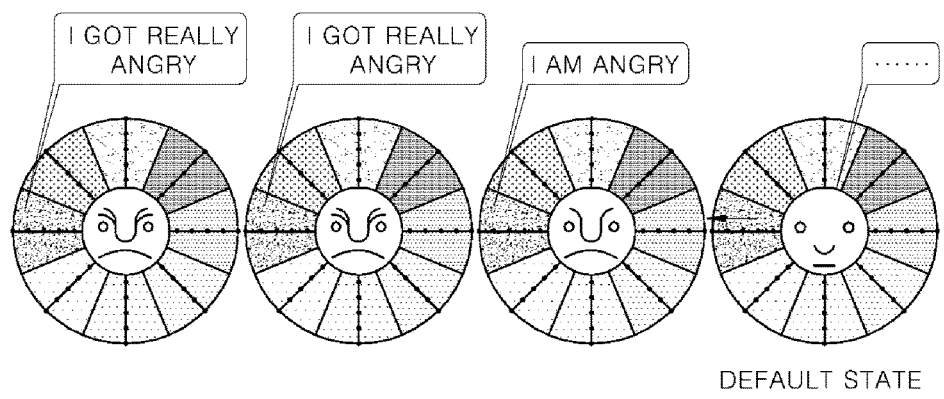
FIG. 9 is a diagram illustrating a process of selecting 'anger' and its scale concurrently by one selection gesture (for example, a touch) through the image and the emotion selection menu of FIG. 8.

FIG. 9 is a diagram illustrating a process of selecting 'anger' and its scale concurrently by one selection gesture (for example, a touch) through the image and the emotion selection menu of FIG. 8.

Also, the image may be a photo, for example, a photo of the user and the like. In this case, a most angry expression may be matched to an anger menu with respect to the image, and thereby, an extent of emotion change based on distances may be effectively selected by automatically making an expression change between a normal expression and a most angry expression. As described in the foregoing, the image changing based on the emotion selection may be changeably matched by the user.

Hereinabove, the method for expressing the emotion during game play according to the first embodiment of the present disclosure that may determine and transmit a user emotion effectively in a fast-paced game situation has been described, and hereinafter a method for expressing an emotion during game play according to a second embodiment of the present disclosure in which a user may make a prompt response to an emotion expression of an opponent will be described.

Figure 10:
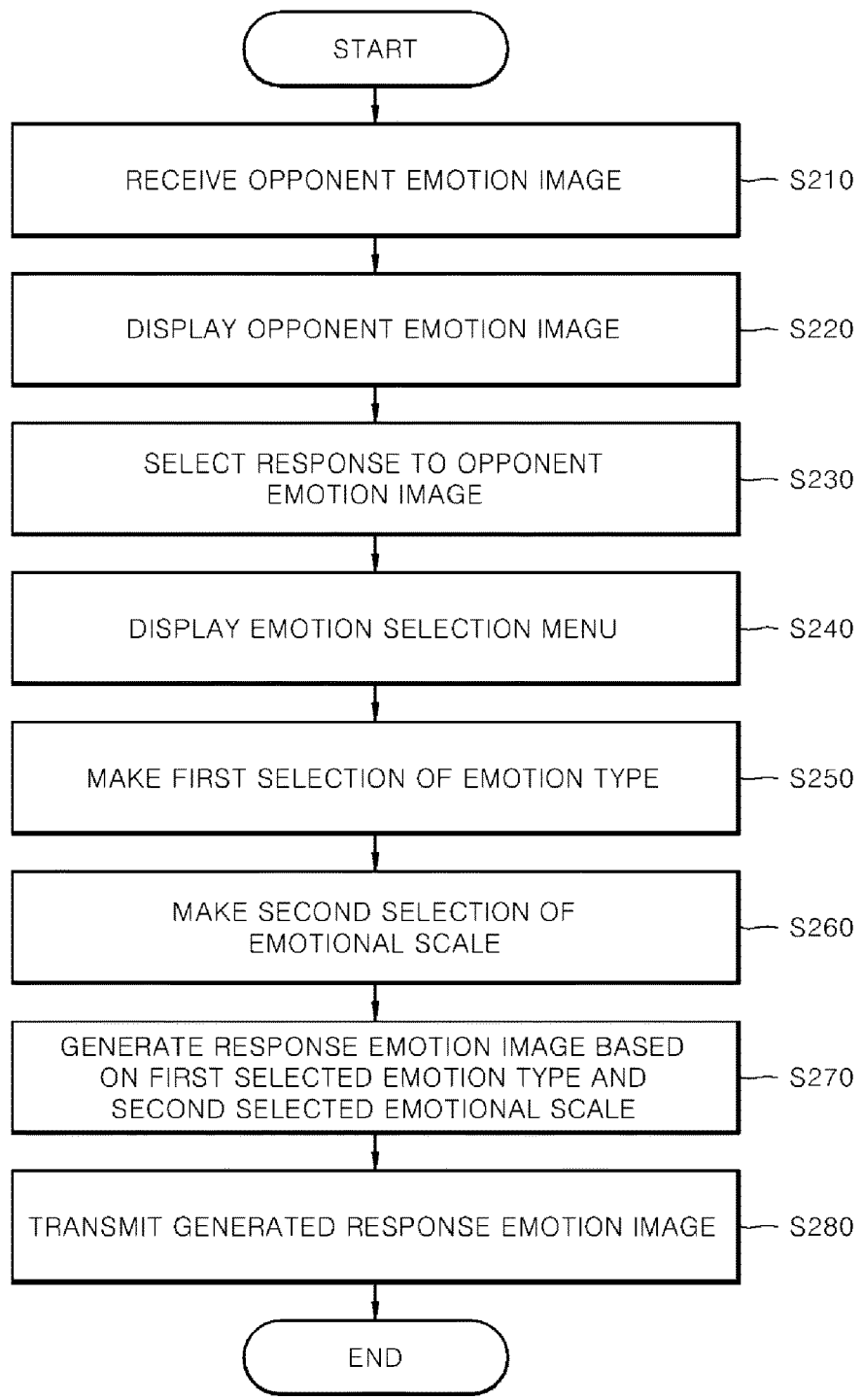
FIG. 10 is a flowchart illustrating a method for expressing a user emotion during game play according to a second embodiment of the present disclosure.

FIG. 10 is a flowchart illustrating a method for expressing a user emotion during game play according to a second embodiment of the present disclosure.

Referring to FIG. 10, the method for expressing the user emotion during game play according to the second embodiment of the present disclosure includes receiving an opponent emotion image (S210), displaying the opponent emotion image (S220), selecting a response to the opponent emotion image (S230), displaying an emotion selection menu (S240), making a first selection of an emotion type (S250), making a second selection of an emotional scale (S260), changing a response emotion image based on the first selected emotion type and the second selected emotional scale (S270), and transmitting the changed response emotion image (S280).

First, an opponent emotion image 310 generated in an opponent terminal is received via a server (S210). Here, the opponent emotion image 310 corresponds to an image representing an emotion selected by an opponent, and may be an image generated by the opponent through an emotion selection menu according to the first embodiment of the present disclosure described in the foregoing. Also, the opponent emotion image 310 may include an emotion image generated according to the first embodiment of the present disclosure and images generated by various methods for expressing a user emotion as well.

Also, not only the opponent emotion image 310 but only identification information of the opponent and emotion information including an emotion type and an emotional scale of the opponent emotion image 310 may be further received from the opponent terminal.

Also, the opponent emotion image 310 is displayed on a display of a terminal (S220). The received opponent emotion image 310 may be outputted at a location enabling the user to easily perceive an emotion of the opponent, for example, on a chat window or a character of the opponent. Also, the opponent emotion image 310 may be displayed by adding various image effects such as enlargement, a color change, and flashing, to the opponent emotion image 310.

Figure 11:
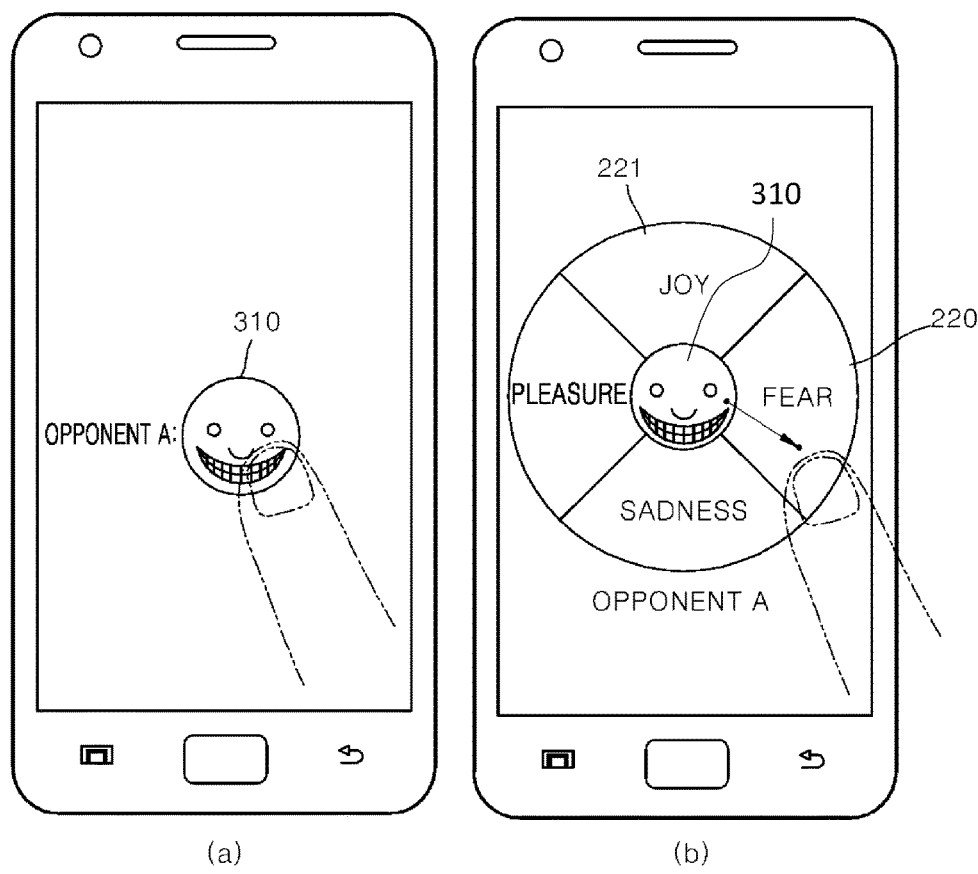
FIGS. 11 through 14 are diagrams illustrating the method for expressing the emotion during game play according to the second embodiment of the present disclosure.

Also, the present disclosure may display the opponent emotion image 310 on a center of the emotion selection menu 220 as illustrated in (b) of FIG. 11. In this case, an emotion type and an emotional scale of the opponent emotion image 310 are recognized using the received emotion information. Also, the opponent emotion image 310 may be displayed at a location of the emotion selection menu 220 corresponding to the emotion type and the emotional scale of the opponent emotion image 310 as illustrated in (a) of FIG. 12. Also, the present disclosure may recognize the emotion type and the emotional scale of the opponent emotion image 310 through self-analysis of the opponent emotion image 310.

Also, the opponent emotion image 310 may be displayed by adding identification information of the opponent to the opponent emotion image 310. Its detailed description will be provided with reference to FIG. 12.

Also, a response to the opponent emotion image 310 is selected based on a response signal of the user (S230). For example, an electrical signal generated by a touch or mouse click signal may be a response signal of the user, and in this instance, the response signal of the user may be generated at one point of the opponent emotion image 310.

That is, the user responds to the emotion expression of the opponent by inputting a click or touch signal into the displayed opponent emotion image 310.

When the response to the opponent emotion image 310 is made, the emotion selection menu 220 including at least two emotion menus is displayed with respect to the opponent emotion image 310 (S240).

As described previously in the first embodiment of the present disclosure, the at least two emotion menus are radially formed with respect to the opponent emotion image 310 in a shape of a bar or a pizza slice, and contrasting emotions (for example, 'anger'-'joy', 'excitement'-'boredom') are symmetrically organized.

Also, a first selection of an emotion type is made based on a user selection signal for any one of the displayed at least two emotion menus (S250), and a second selection of an emotional scale is made (S260). Also, a response emotion image 320 is generated based on the first selected emotion type and the second selected emotional scale (S270).

A method for generating the response emotion image 320 in S260 through S270 is the same as the first embodiment of the present disclosure.

That is, after the emotion selection menu 220 is displayed with respect to the opponent emotion image 310, the first selection of the emotion type is made based on the user selection signal for any one of the displayed at least two emotion menus (S250), and the second selection of the emotional scale is made based on a distance between one point of the emotion selection menu 220 where the user selection signal is generated (that is, a location on the display where the user selection signal is generated) and the opponent emotion image 310 (S260).

Subsequently, the response emotion image 320 is generated based on the first selected emotion type and the second selected emotional scale (S270). First, the opponent emotion image 310 changes based on the first selected emotion type and the second selected emotional scale. The image is changed such that a type of the image change is determined based on the emotion type and an extent of the image change is determined based on the emotional scale. The changed opponent emotion image 310 is generated into the response emotion image 320.

Also, the generated response emotion image 320 is transmitted to the opponent terminal via the server (S280). By transmitting the response emotion image 320 to the opponent terminal, the user responds to then emotion expression of the opponent.

Accordingly, the user may make a quick and efficient response to then emotion expression of the opponent through the emotion selection menu 220 even in a fast-paced game situation.

Hereinafter, the method for expressing the emotion during game play according to the second embodiment of the present disclosure is described in detail with reference to the drawings.

FIGS. 11 through 14 are diagrams illustrating the method for expressing the emotion during game play according to the second embodiment of the present disclosure.

Referring to FIG. 11, (a) illustrates that the opponent emotion image 310 is outputted to the display of the terminal. The opponent emotion image 310 received from the opponent terminal is outputted at a location on the display enabling the user to easily perceive the emotion of the opponent, for example, on a chat window or a character of the opponent, along with identification information of the opponent (opponent A). As described in the foregoing, the opponent emotion image 310 may be displayed by adding various image effects such as enlargement, a color change, and flashing, to the opponent emotion image 310.

When the user inputs a response signal by clicking or touching the opponent emotion image 310, the emotion selection menu 220 is displayed with the opponent emotion image 310 in the center as shown in (b).

In the emotion selection menu 220, the user makes a first selection of an emotion type and a second selection of an emotional scale. The user selects an emotion to provide a response to the opponent, among the emotion selection menu 220 displayed with respect to the opponent emotion image 310. In (b) of FIG. 11, selection of the emotion type and the emotional scale of 'fear' by the user is illustrated.

Also, the response emotion image 320 is generated based on the first selected emotion type and the second selected emotional scale.

Figure 12:
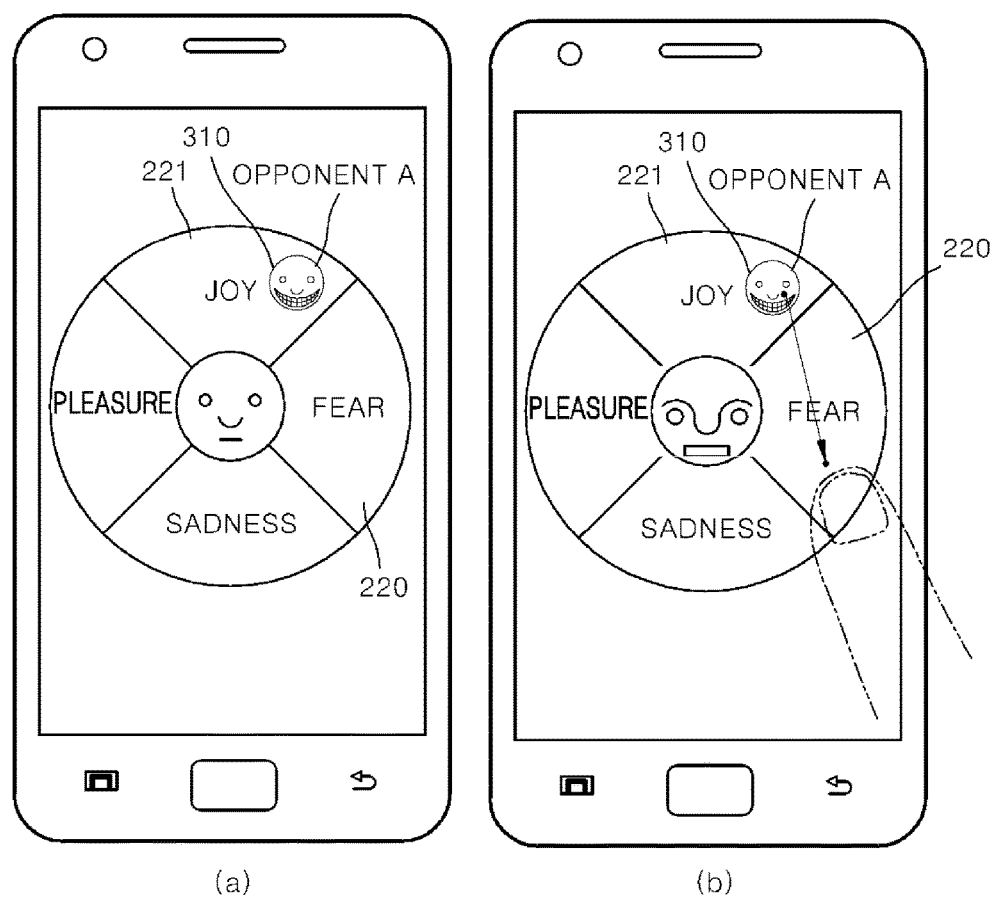

FIG. 12 illustrates that the opponent emotion image 310 is displayed on the emotion selection menu 220. In the second embodiment of the present disclosure, the opponent emotion image 310 received from the opponent terminal may be displayed on the emotion selection menu 220 outputted previously.

As described in the foregoing, not only the opponent emotion image 310 but also identification information and emotion information may be received from the opponent terminal. Accordingly, using the received emotion information, an emotion type and an emotional scale of the opponent emotion image 310 may be recognized, and the opponent emotion image 310 may be displayed at a location of the emotion selection menu 220 corresponding to the emotion type and the emotional scale.

In (a), the opponent emotion image 310 of 'opponent A' displayed on the emotion selection menu 220 upon receipt is illustrated. Also, as shown in the drawing, the opponent emotion image 310 may be outputted together with identification information of the opponent.

The user may respond to the emotion expression of the opponent by selecting the opponent emotion image 310 displayed on the emotion selection menu 220. That is, after the user makes a selection by clicking or touching the opponent emotion image 310, the user makes a first selection of an emotion type and a second selection of an emotional scale among the emotion selection menu 220. Thus, the response emotion image is generated based on the first selected emotion type and the second selected emotional scale.

In (b), the user responding to the emotion expression of 'opponent A' by dragging and dropping the opponent emotion image 310 of 'opponent A' to a location of 'fear' is illustrated. Also, as shown in (b), the user may select the emotion type and the emotional scale by inputting various user signals including a drag-and-drop as well as a click or a touch.

According to the second embodiment of the present disclosure, a plurality of opponent emotion images 310 may be outputted onto one emotion selection menu 220, and a response to each of the opponent emotion images 310 may be made in the single emotion selection menu 220. As a result, there is an effect of responding to emotion expressions of a plurality of opponents more quickly and effectively.

Figure 13:
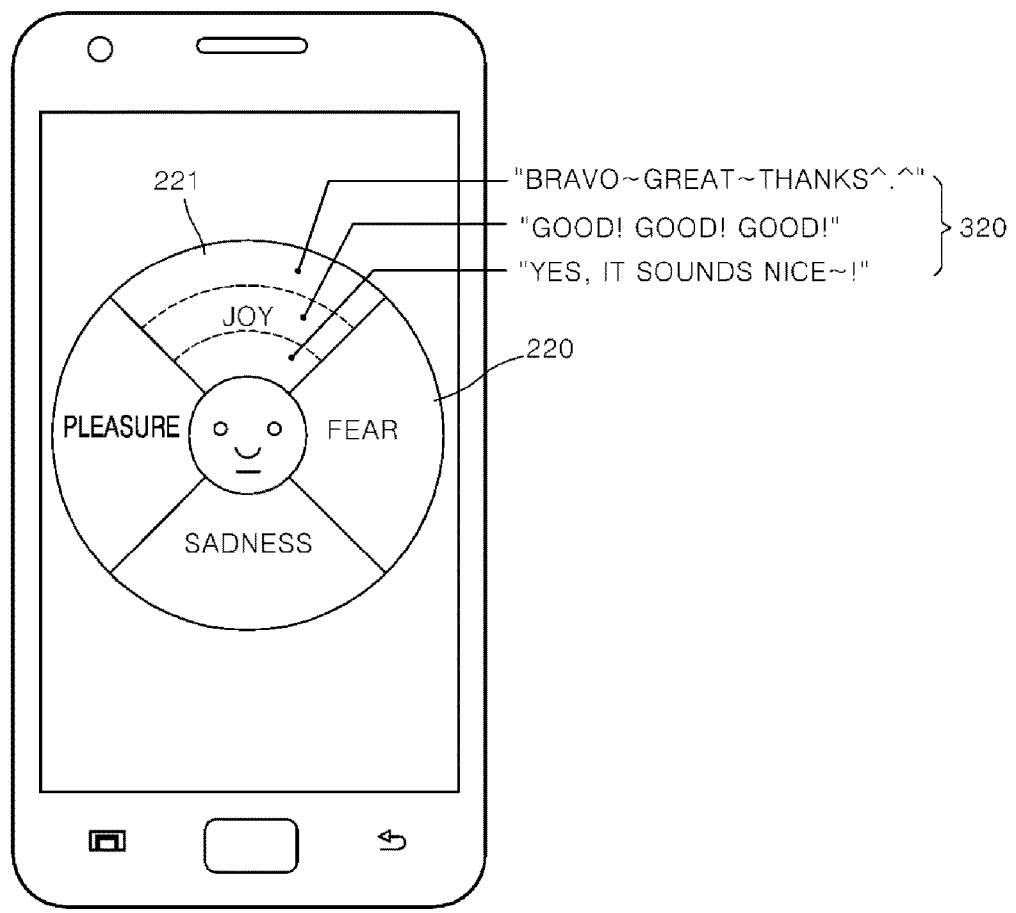

FIG. 13 illustrates a response emotion message 320 based on three emotional scales for an emotion type 'joy'.

The present disclosure may generate the response emotion message 320 as well as the response emotion image 310, based on the emotion type and emotional scale selected by the user. The response emotion message 320 is a message corresponding to the emotion type and the emotional scale selected by the user through the emotion selection menu 220.

When the response emotion image 310 is generated, a message corresponding to the emotion type and the emotional scale selected by the user is selected among the preset response emotion message 320 and is transmitted to the opponent.

That is, a message corresponding to each emotion type and each emotional scale may be preset to the response emotion message 320. In the drawing, it can be seen that the response emotion message 320 is preset based on three emotional scales for an emotion type 'joy'. Also, the response emotion message 320 may be set by receiving an input of a message corresponding to each emotion type and each emotional scale from the user.

Accordingly, the present disclosure has an effect of transmitting a user emotion quickly and effectively during a game not supporting an output of an emotion image or in an opponent terminal.

Figure 14:
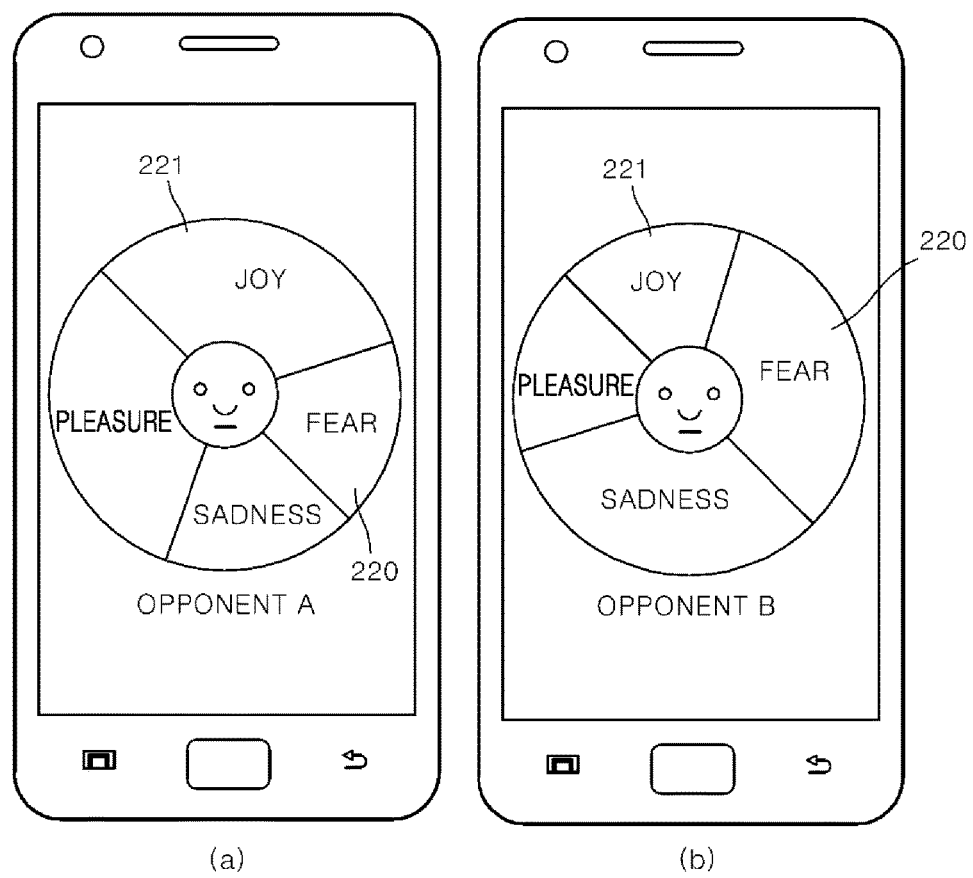

FIG. 14 illustrates the emotion selection menu 220 changing in a size of an emotion menu.

The present disclosure may change a size of an emotion menu for an emotion based on how often the corresponding emotion is transmitted to or received from an opponent. That is, for an emotion of which mutual transmission takes place frequently, a size of an emotion menu of the corresponding emotion may increase, and for an emotion of which mutual transmission rarely takes place, a size of an emotion menu of the corresponding emotion may reduce.

Describing with reference to the drawing, (a) illustrates the emotion selection menu 220 for 'opponent A', and (b) illustrates the emotion selection menu 220 for 'opponent B'. That is, (a) illustrates the emotion selection menu 220 for the opponent emotion image 310 received in a terminal of 'opponent A', and (b) illustrates the emotion selection menu 220 for the opponent emotion image 310 received in a terminal of 'opponent B'.

In the drawing, it can be seen that the emotion selection menu 220 of 'opponent A' has emotion menus 'joy' and 'pleasure' of a large size. This implies frequent transmission of emotions 'joy' and 'pleasure' between the user and 'opponent A'.

Similarly, it can be seen that the emotion selection menu 220 of 'opponent B' has emotion menus 'fear' and 'sadness' of a large size. This implies frequent transmission of emotions 'fear' and 'sadness' between the user and 'opponent B'.

Accordingly, the terminal recognizes the frequency of an emotion transmitted and received between the user and the opponent by analyzing the emotion. Also, the emotion selection menu 220 for the corresponding opponent is generated by increasing a size of an emotion menu corresponding to an emotion of high frequency and reducing a size of an emotion menu corresponding to an emotion of low frequency.

Accordingly, the present disclosure has an effect of making a response to an emotion expression of an opponent more efficiently by generating the emotion selection menu 220 differently based on opponents.

The present disclosure may provide a system for implementing the above-mentioned method for expressing the emotion during game play and a game terminal (a mobile phone and the like) used therein.

Figure 15:
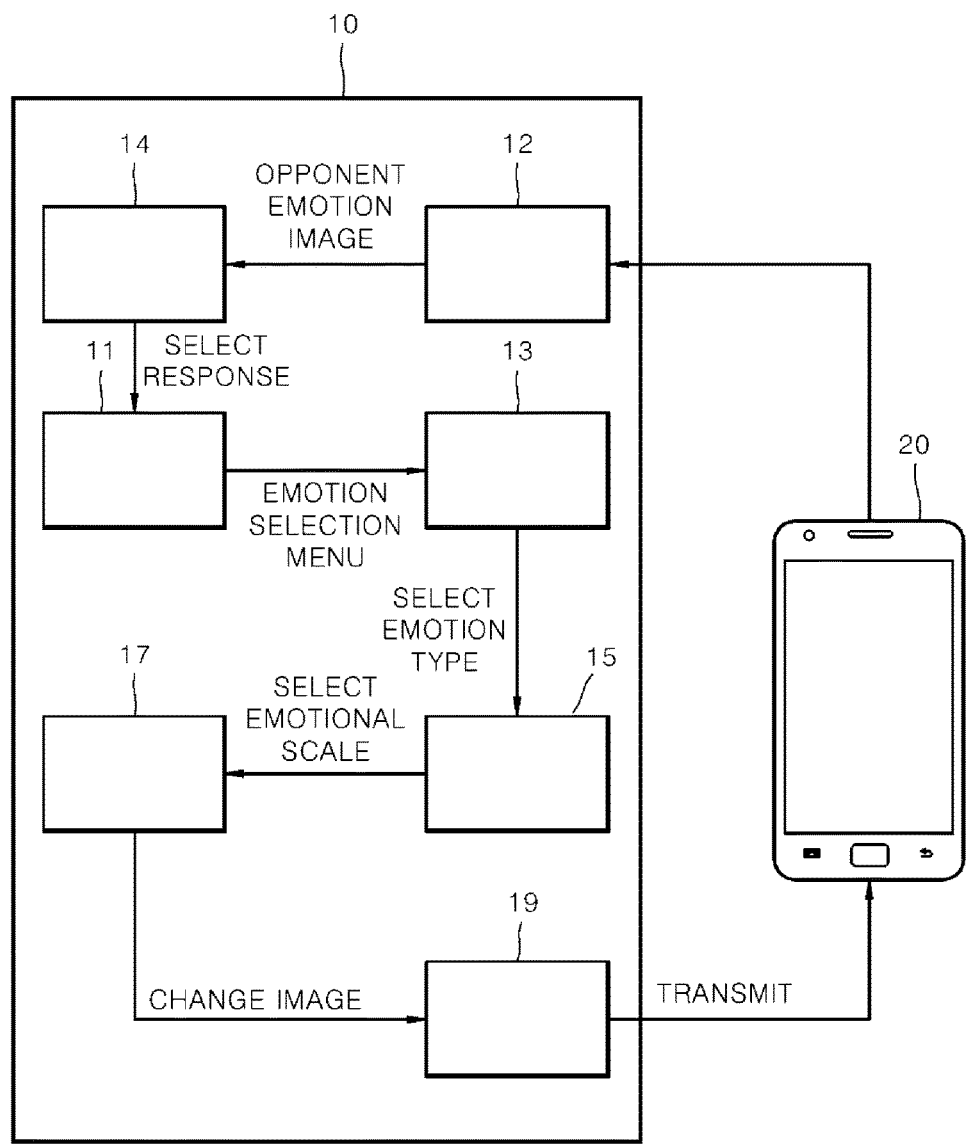
FIG. 15 is a block diagram illustrating a system for expressing a user emotion during game play according to an embodiment of the present disclosure.

FIG. 15 is a block diagram illustrating a system for expressing a user emotion during game play according to an embodiment of the present disclosure.

Referring to FIG. 15, the system includes a terminal 10 equipped with a display to display an image representing a user emotion, and a server 20 to transmit information of the image displayed on the terminal 10 to a terminal of an opponent. In the embodiments of the present disclosure, the terminal 10 may correspond to a computer or a mobile device such as a mobile phone, a tablet computer, and the like, and transmission of the server may be based on a wired or wireless communication scheme.

Here, the terminal 10 includes an emotion menu display unit 11 to display at least two emotion menus with respect to the image provided on the display, an emotion type selection unit 13 to select an emotion type based on a user selection signal for any one of the at least two emotion menus, an emotional scale selection unit 15 to select an emotional scale based on a distance between a location on the display where the user selection signal is generated and the image, and an image change unit 17 to change the image provided on the display based on the selected emotion type and emotional scale.

The emotion menu display unit 11 provided in the terminal displays the emotion menu radially with respect to the image in a shape of a bar or a slice, and symmetrically organizes opposing emotion types. The emotion type may be identified more intuitively by symmetrically organizing opposing emotions, for example, 'surprise'-'anticipation' and 'pleasure'-'sadness', as shown in FIG. 8.

In the embodiments of the present disclosure, the display may be a touch display, and the user selection signal may be a touch signal on the display of the terminal. Also, the image may be a character or a photo, and in a case of a photo, a photo matched to the emotion selection menu may automatically change based on a selection location as described in the foregoing.

Also, the terminal 10 of the system for expressing the emotion during game play according to the embodiment of the present disclosure may further include a transmission unit 19 to transmit information of the image changed by the image change unit 17 to an opponent terminal 20 via the server.

Also, the terminal 10 may further include a receiving unit 12 and an opponent emotion display unit 14.

The receiving unit 12 receives the opponent emotion image 310 transmitted from the opponent terminal 20. Also, the receiving unit 12 may further receive identification information and emotion information of the opponent from the opponent terminal 20.

The opponent emotion display unit 14 outputs, to the display, the opponent emotion image 310 transmitted from the opponent terminal 20. The opponent emotion display unit 14 outputs the opponent emotion image 310 onto a chat window or a character, and may enable the user to intuitively perceive an emotion expression of the opponent by outputting identification information of the opponent together.

Also, the emotion menu display unit 11 outputs the emotion selection menu 220 by displaying the emotion menu radially with respect to the opponent emotion image 310 in a shape of a bar or a slice.

The present disclosure described hereinabove may be executed as program instructions for implementation thereof, and computer-readable recoding medium for recording the program instructions includes, for example, read-only memory (ROM), random access memory (RAM), CD ROM disks, magnetic tape, floppy disks, optical media storage devices, and the like.

The computer-readable recording medium for recording the program described in the foregoing can also be distributed over network-coupled computer systems so that computer-readable code is stored and executed in a distributed fashion. In this case, at least one computer among a plurality of distributed computers may execute a portion of the functions described in the foregoing and transmit the execution result to at least one of the other distributed computers, and the computer receiving the result may also execute a portion of the functions described in the foregoing and provide the other distributed computers with the result.

It should be understood that computer-readable recording medium for recording an application as the program for operating the method for expressing an emotion during game play according to the embodiments of the present disclosure includes a general personal computer (PC) such as a desktop computer or a laptop computer, and a mobile terminal such as a smartphone, a tablet computer, a personal digital assistant (PDA) and a mobile communication terminal, and encompasses all types of computing devices.

Although the above description shows that all the components constituting the embodiments of the present disclosure are combined into one or operate in association therewith, the present disclosure is not limited by the exemplary embodiments. That is, within the range of purpose of the present disclosure, all the components may be selectively combined into at least one and operate in association therewith. Also, while all the components may be respectively implemented as an independent hardware, some or all of the components may be implemented as a computer program having a program module which performs some or all of the combined functions on one or a plurality of hardware. Also, codes or code segments comprising the computer program can be easily inferred by one of ordinary skill in the art pertaining to the present disclosure. The computer program is stored in computer-readable media and is read and executed by the computer so that the embodiments of the present disclosure may be implemented. The computer-readable media may include magnetic recording media, an optical recording media, and the like.

It will be further understood that unless stated to the contrary, the term "comprising", "including", or "having" as mentioned above specify the presence of a corresponding component, but do not preclude the presence or addition of one or more other components. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The above description is merely provided to illustrate the technical spirit of the present disclosure, and it will be apparent to those skilled in the art that various changes and other equivalent embodiments may be made without departing from the essential feature of the present disclosure. Therefore, the embodiments disclosed in the present disclosure are just by way of illustration, but not intended to limit the technical spirit of the present disclosure, and the technical protection scope of the present disclosure is not limited by these embodiments. It should be understood that the true technical protection scope of the present disclosure is interpreted by the appended claims and all the technical spirit within the equivalent range thereto is included in the protection scope of the present disclosure.

What is claimed is:

1. A method for expressing a user emotion in a system for playing game, the system including
a first terminal operated by a first user,
a first display connected to the first terminal,
a second terminal operated by a second user,
a second display connected to the second terminal, and
a server transmitting information between the first terminal and the second terminal,
the method comprising:
receiving, by the first terminal, from the second terminal, a first emotion image including an emotion type and an emotional scale, wherein the first emotion image represents emotions of the second user;
displaying, by the first terminal, an emotion selection menu on the first display, wherein the emotion selection menu has a circular shape with a number of sectors and includes various types of emotion in the sectors;
displaying, by the first terminal, the first emotion image at a first location within a first sector of the emotion selection menu, wherein the first sector corresponds to the emotion type of the first emotion image, and a first lineal distance from a center of the emotion selection menu to the first location is proportional to the emotion scale of the first emotion image;
dragging and dropping, by the first user, the first emotion image from the first location to a second location within a second sector of the emotion selection menu;
determining, by the first terminal, a first selection input and a second selection input, wherein the first selection input determines an emotion type of the first user and is determined by a type of emotion corresponding to the second sector into which the first emotion image is dropped, and the second selection input determines an emotional scale of the emotion type selected in the first selection input based on a second lineal distance from the first location to the second location;
generating, by the first terminal, a second emotion image based on the first selection input and the second selection input, wherein the second emotion image represents emotions of the first user and is displayed in the center of the emotion selection menu; and
transmitting, by the first terminal, the second emotion image to the second terminal.

* * * * *